US005963368A

United States Patent [19]
Domanik et al.

[11] Patent Number: 5,963,368
[45] Date of Patent: Oct. 5, 1999

[54] SPECIMEN MANAGEMENT SYSTEM

[75] Inventors: Richard A Domanik, Libertyville; Peter G. Gombrich, Chicago; William J. Mayer, South Barrington, all of Ill.

[73] Assignee: AccuMed International, Inc., Chicago, Ill.

[21] Appl. No.: 08/926,182

[22] Filed: Sep. 9, 1997

Related U.S. Application Data

[62] Division of application No. 08/528,793, Sep. 15, 1995, abandoned.

[51] Int. Cl.$^6$ ............................ G02B 21/34; G02B 21/26; G01N 21/00
[52] U.S. Cl. ........................ 359/396; 359/391; 359/397; 359/398; 356/72
[58] Field of Search ........................ 359/396, 391, 359/397, 398; 356/72

[56] References Cited

U.S. PATENT DOCUMENTS

| | | | |
|---|---|---|---|
| 3,418,456 | 12/1968 | Hamisch et al. | 235/464 |
| 3,600,556 | 8/1971 | Acker | 250/217 |
| 3,745,314 | 7/1973 | Mathias et al. | 235/61.11 E |
| 3,851,972 | 12/1974 | Smith et al. | 356/72 |
| 3,902,615 | 9/1975 | Levy et al. | 414/331 |
| 4,141,458 | 2/1979 | Brooks et al. | 214/301 |
| 4,175,860 | 11/1979 | Bacus | 356/39 |
| 4,250,405 | 2/1981 | Ashcroft et al. | 235/456 |
| 4,367,915 | 1/1983 | Georges | 356/446 |
| 4,402,613 | 9/1983 | Daly et al. | 356/446 |
| 4,422,105 | 12/1983 | Rodesch et al. | 358/903 |
| 4,427,332 | 1/1984 | Manriquez | 414/331 |
| 4,449,042 | 5/1984 | Hampson et al. | 235/464 |
| 4,588,341 | 5/1986 | Motoda | 414/32 |
| 4,628,193 | 12/1986 | Blum | 235/375 |
| 4,858,014 | 8/1989 | Zeevi et al. | 358/217 |
| 4,965,725 | 10/1990 | Rutenberg | 364/413.1 |
| 5,021,218 | 6/1991 | Davis et al. | 422/104 |
| 5,081,038 | 1/1992 | Sugaya et al. | 436/46 |
| 5,209,903 | 5/1993 | Kanamori et al. | 422/65 |
| 5,260,556 | 11/1993 | Lake et al. | 235/494 |
| 5,287,182 | 2/1994 | Haskell et al. | 348/500 |
| 5,287,272 | 2/1994 | Rutenberg et al. | 364/413.01 |
| 5,364,790 | 11/1994 | Atwood et al. | 359/398 |
| 5,513,013 | 4/1996 | Kuo | 358/448 |
| 5,526,258 | 6/1996 | Bacus | 364/413.1 |

FOREIGN PATENT DOCUMENTS

| | | |
|---|---|---|
| 849379 | 8/1970 | Canada . |
| 63-305510 | 12/1988 | Japan . |
| WO 90/07162 | 6/1990 | WIPO . |
| WO 93/16436 | 8/1993 | WIPO . |

OTHER PUBLICATIONS

"Nikon Biostation® Creates A Fully Automated Cytology Workstation In Your Laboratory", pp. 1–3, Feb. 1994.

G. Brugal et al., "Introduction to Cytometry and Histometry", pp. 1–7, Jan. 20–24 and 27–31, 1992.

The LEP Robotic Slide Handling System (description and photograph), by Ludl Electronic Products, Ltd., date unknown.

*Primary Examiner*—Cassandra Spyrou
*Assistant Examiner*—Mohammad Y. Sikder
*Attorney, Agent, or Firm*—McDonnell, Boehnen, Hulbert & Berghoff

[57] ABSTRACT

A system for managing specimens in a clinical laboratory comprises specimens and a computer controlled instrument. Each specimen includes a biological sample and an identifier which is unique to the specimen to which it is applied. The computer controlled instrument includes a reader for automatically logging and verifying the specimen to be analyzed, and a print head for modifying the identifier to indicate whether the specimen has been analyzed and whether the sample includes any abnormalities. The print head is also used to indicate whether the specimen has been reanalyzed. Further, the print head works to print symbols adjacent the locations of the abnormalities in the sample.

30 Claims, 2 Drawing Sheets

SPECIMEN MANAGEMENT SYSTEM

CROSS REFERENCE TO RELATED APPLICATIONS

This application is a continuation of application Ser. No. 08/528,793, filed Sept. 15, 1995, now abandoned.

The present application is related to the following applications which are filed concurrently herewith:

Automated Specimen Handling System and Method for Sorting the Specimens Filed by: Richard A. Domanik, Peter G. Gombrich, Dennis W. Gruber, and William J. Mayer Cytological Specimen Analysis System with Individualized Patient Data Filed by: Vladimir Dadeshidze, Richard A. Domanik, Peter G. Gombrich, and Lars Jonas Olsson Three Dimension Mouse Filed by: Richard A. Domanik, Peter G. Gombrich, Dennis W. Gruber, Gordon Guth, and William J. Mayer System for Simplifying the Implementation of Specified Functions Filed by: Richard A. Domanik, Dennis W. Gruber, and William J. Mayer Multifunctional Control Unit for a Microscope Filed by: Richard A. Domanikc, Dennis W. Gruber, Peter G. Gombrich, and William J. Mayer Cassette for Use with Automated Specimen Handling System Filed by: Egon Babler, Richard A. Domanik, Peter G. Gombrich, and William J. Mayer Each of the above applications is assigned to the assignee of the present application and is hereby incorporated by reference.

FIELD OF THE INVENTION

The present invention pertains to the management of specimens in a clinical laboratory or like facility.

BACKGROUND OF THE INVENTION

Proper screening of cytological specimens is an important step in the diagnosis of numerous potentially serious maladies. For instance, accurate screening of Pap smears, which are routinely taken for women, can detect the early stages of cancer and thus reduce the risk of the cancer or related abnormal condition from spreading. The results of the analysis performed at a laboratory are often used to determine or guide patient treatment. The results of each analysis must therefore be reported back to the attending physician accurately and in a timely manner. As can be appreciated, it is essential that the reported results be unequivocally linked to both the patient providing the specimen and the analysis performed on the specimen.

Specimen management systems of various levels of sophistication have evolved to meet this need. All such systems rely upon the use of an identifying label which is attached to the specimen. The label is then used to check and verify the handling of the specimen as it passes through the laboratory. Typically, the label includes an identification number (or other indicia) which is associated with a particular sample. At each specified checkpoint, the identification number is manually entered into a travel or log form. A few laboratories have included bar codes on the labels. In such cases, a wand type bar code reader has sometimes been used to enter the number into an electronic log.

Many of the instruments used in a clinical laboratory for cytological examination are batch analyzers. In other words, multiple specimens are loaded into a carrier (e.g., a cassette) which is, in turn, loaded into the instrument. The specimens will commonly be checked and logged by the technician prior to the analysis. As can be appreciated, reliance on the technician to log the identification number is not only a labor intensive process, but is also subject to errors. While certain high volume clinical chemistry analyzers include additional checkpoints within the instrument to confirm the identity of a specimen before or during the analysis, such steps have not been taken in cytological examinations.

Once the specimen has been logged, it is examined by the technician for abnormalities. If abnormalities are found, it is a common practice for the technician to manually place a dot with a sharp point marker on the cover slip adjacent the abnormality. As can be appreciated, manual marking of the cover slip is again a labor intensive operation which is subject to error and inconsistency in the marking.

When the examination has been completed, the operator will make an additional entry onto the log form to indicate that the sample has been examined and whether abnormalities are present. The technician may also make a manual notation on the slide's label to further indicate that examination has been completed.

SUMMARY OF THE INVENTION

The management of specimens in accordance with the present invention includes automatic verification and logging of identifiers in conjunction with computer controlled instruments, such as automated microscopes. The specimen management system also alters the specimens' identifiers to provide a visual indication of their status. As a result, the clerical burden on the technician is lessened, and the risk of errors diminished.

More specifically, each specimen is provided with an identifier which includes a unique code associated with the specimen to which it is applied. The identifier both includes machine readable portions and portion readable by the technicians. The machine readable portions of the identifier enable the instrument to automatically log the specimen prior to the analysis of the sample. The system further permits the data obtained from the analysis to be electronically coupled with the code. Further, the system permits the identifier to be altered to provide a visual indication of the status of the specimen.

BRIEF DESCRIPTION OF THE DRAWINGS

Various objects, features, and attendant advantages of the present invention can be more fully appreciated as the same become better understood with reference to the following detailed description of the present invention when considered in connection with the accompanying drawings, in which.

DETAILED DESCRIPTION OF THE PREFERRED EMBODIMENT

Figure 1:
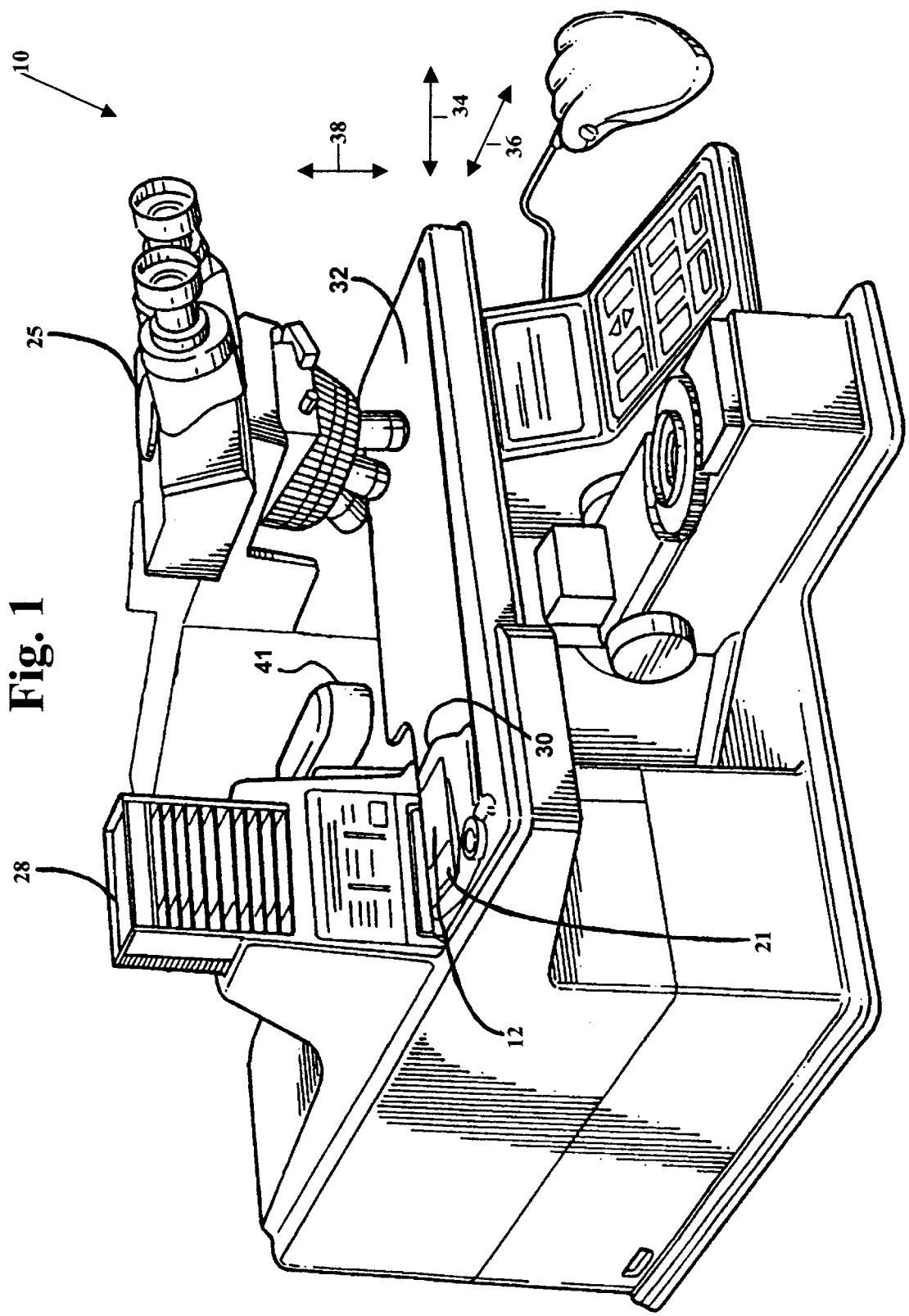
FIG. 1 is a perspective view of an automated microscope in accordance with the preferred embodiment of the present invention.
Figure 2:
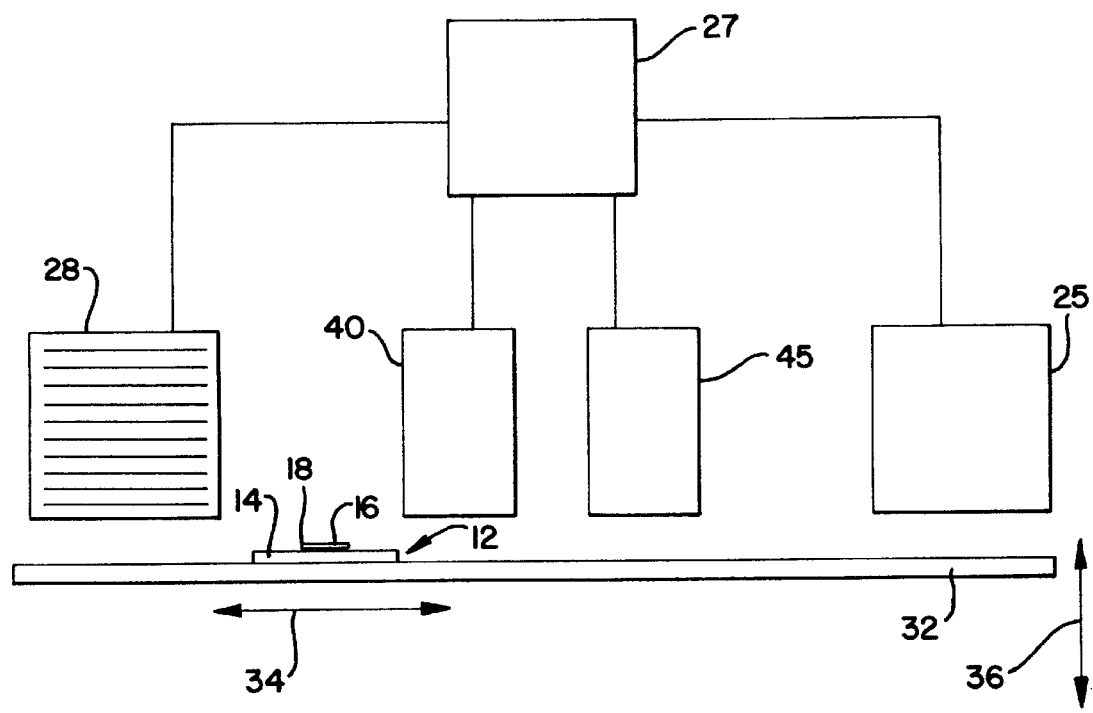
FIG. 2 is a schematic view of the automated microscope.
Figure 3:
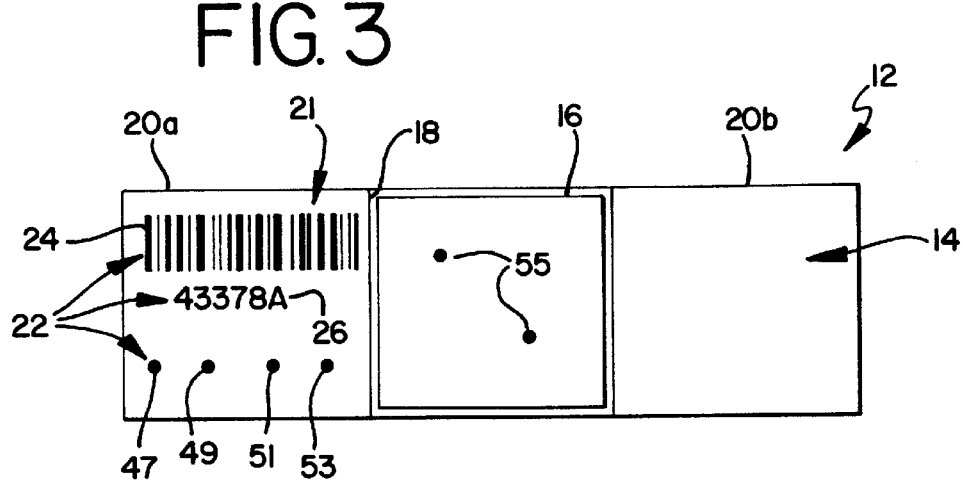
FIG. 3 is a top plan view of a specimen with an identifier in accordance with the preferred embodiment of the present invention.

Referring to FIGS. 1–3, the specimen management system of the present invention is adapted for use in a clinical laboratory or like facility which uses computer controlled instruments, such as an automated microscope 10.

Preferably, the automated microscope 10 is an Olympus BX-40 microscope device, available from Olympus Optical Corporation of Tokyo, Japan. Computer controlled microscopes are used to analyze biological samples of patients, such as Pap smears. In the analysis of Pap smears or other cytological examinations, the sample is examined for the presence of abnormal cells which could indicate the presence of cancer or other malady.

The specimens 12 for an automated microscope 10 typically include an elongate slide 14, a biological sample 16 centrally positioned on the slide, and a cover slip 18 which overlies the sample 16. The slide 14 and the cover slip 18 are usually composed of glass; although plastic could also be used. As seen in FIG. 3, the slide 14 defines end sections 20a, 20b to each side of the sample 16 and the cover slip 18. One of the end sections (e.g., the left-hand side 20a) defines an identification space 21 for receipt of an identifier 22. Typically, the identification space 21 will be about one inch by one inch square.

In the preferred construction, the identifier 22 includes a bar code 24 (e.g., code 128) printed on one end section 20a of the slide. The bar code 24 represents an identification number which is unique to the particular specimen to which it is applied. The number is also preferably set forth in Arabic numerals or other human readable characters 26. To provide an unbroken log for the specimen, the bar code is applied to the specimen and any associated paperwork at the time they are received by the laboratory. While the bar code is preferably printed directly on the slide, it may also be printed on label which is adhered to the slide on the identification space 21.

The identifier 22 may also be provided in other forms. For instance, the identifier may include other machine readable codes (e.g., Optical Character Recognition) besides a bar code. The identifier may also include an electronic ID provided with the proper numerical code. As can be appreciated, the type of reader that is used with the microscope 10 will depend on the form of the identifier used in the particular laboratory. In the preferred construction, a Symbol Technologies SE-1022 bar code reader 40, available from Symbol Technologies Inc. of Marietta, Ga., is used.

In use, a plurality of the specimens 12 are mounted in a cassette 28 or other carrier (e.g., a rack or carrousel). Once the cassette is installed, the specimens 12 are sequentially fed from the cassette onto a specimen handler 30 for manipulation during the procedure. In the preferred operation, the specimens are mounted face up with the identification space 21 on the operator's left.

In general, the specimen handler 30 is mounted for movement along the stage 32 of the microscope. In the preferred construction, the slide handler 30 is movable in the X direction (arrow 34) along the stage 32 by a conventional screw drive mechanism (not shown). The stage 32 is, in turn, movable in the Y direction (arrow 36) and the Z direction (arrow 38). Nevertheless, other constructions could be used. In any event, the slide is preferably placed beneath a bar code reader 40 mounted within the housing 41. The bar code reader 40 reads the bar code 24 on the specimen 12 and electronically logs the specimen in the specimen handler 30.

If no valid bar code reading is obtained at the first location, additional read attempts can be made at other positions within the identification space 21 of the specimen. If such repositioning still does not result in a valid reading, the slide is repositioned again such that the bar code reader overlies the right-hand end 20b of the specimen. A plurality of readings can also be attempted on the right-hand side of the specimen as needed. If no valid bar code reading is obtained at any position, the system assumes that the slide either lacks a bar code or the slide has been mounted in a face down orientation. In either event, the operator is notified that a fault condition exists and the operation is stopped. If a valid read is obtained on the right-hand end 20b of the slide, the system assumes that the slide has been reversed. In this case, the coordinates defining the scan area defined by the automatic scan feature of the microscope are adjusted to reflect this reversal. Finally, if a valid bar code read is obtained, the identification number is compared with the identification numbers, downloaded to the microscope from a host computer system, of the specimens in the installed cassette. If the identification numbers do not match, the operator is advised that a fault condition exists and no analysis is performed.

Once the bar code has been properly logged and verified, the specimen is moved to a position beneath the microscope examining device 25 for examination of the sample 16. The samples 16 are then examined for abnormalities, preferably as described in copending U.S. Patent Application entitled Cytological Specimeni Analysis System with Individualized Patient Data, by V. Dadeshidze, R. Domanik, P. Gombrich, and L. D. Olsson. If any abnormalities are present, their locations are electronically marked (i.e., the coordinates for the locations of the abnormalities are stored in the computer 27), preferably as described in copending U.S. Patent Application entitled System for Simplifying the Implementation of Specified Functions, filed by R. Domanik, D. Gruber, and W. Mayer.

Once the examination has been completed, the specimen handler 30 again repositions the specimen beneath the bar code reader 40 for electronically logging that the specimen has been examined, and whether any abnormalities were found. Following this read, the specimen handler 30 positions the identification space 21 of the specimen 12 beneath an ink jet print head 45. The print head 45 is preferably mounted within the housing 41 with the bar code reader 40. Nevertheless, other arrangements could be used.

In the preferred construction, the ink jet print head 45 is an on-demand printer which utilizes a piezoelectric crystal to drive the ink from a conial tip. Although the print head is custom built for this operation, it is assembled in the usual way for such printers. The ink is a wax that melts at a temperature of about 110° C.; although inks with other melting temperatures (down to about 80° C.) may be used. Other printing devices may be used so long as they have the capacity to print on non-porous substrates, such as glass.

In the preferred construction, the print head 45 prints a symbol 47 (e.g., a dot) on the identification space 21 adjacent the bar code 24. If abnormalities are present in the sample, a second symbol 49 is printed on the identification space. By altering the identifier in this manner, the status of the individual specimens can be readily ascertained by a laboratory technician. As can be appreciated, this visual indication of the specimen's status reduces the risk that the specimen will be mishandled by the laboratory.

In normal cytological practice, any specimens including cells which are marked as abnormal during the initial screening are reviewed by another operator to confirm, modify, or refute the diagnosis made by the first operator. Moreover, in the United States, it is mandatory that a certain percentage of all screened specimens be rescreened for quality review purposes. In either case, after the specimen has been examined a second time, a third symbol 51 is printed in the identification space 21. If a positive reading is confirmed or found during the second review, the specimens are reviewed a third time by a pathologist. Following the review of the pathologist, a fourth symbol 53 is printed in the identification space 21.

Of course other symbols or other patterns of symbols could be used to identify the status of the specimens. For example, one symbol may be printed to indicate that the specimen has been examined, a second symbol may be printed to indicate that abnormalities were found, and a numerical character may be printed to indicate the number of abnormalities marked by the operator, each time the specimen is examined. As can be appreciated, however, elaborate marking schemes may be severely hindered by the space limitations of the identification space 21.

The ink jet print head 45 is also used to print symbols adjacent the locations of the abnormalities located by the technician. More specifically, the specimen handler 30 moves in X-Y directions to properly position the sample under the ink jet print head 45, based upon the coordinates selected during the electronic marking of the sample 16. The print head 45 then prints a symbol 55 (e.g., a dot) on the cover slip 18 adjacent the abnormalities. Accordingly, the number and location of the abnormalities are apparent by visual inspection of the specimen by the technician.

The above discussion concerns the preferred embodiments of the present invention. Various other embodiments as well as many changes and alterations may be made without departing from the spirit and broader aspects of the invention as defined in the claims.

We claim:

1. A specimen management system comprising:
    a plurality of specimens, each specimen including a first region with a biological sample to be analyzed and a second region with an identifier, said identifier being physically located on the specimen and having a code that is unique to said specimen;
    a computerized instrument for analyzing said biological samples and stoning data from each said analysis;
    a reader coupled with said computerized instrument for reading said identifier so that said stored data is electronically associated with said code; and
    a modifying device coupled with said computerized instrument for physically and visually modifying said identifiers to indicate on said specimen at least one aspect of said analysis.

2. A system in accordance with claim 1, in which said identifier is indicia printed on said specimen.

3. A system in accordance with claim 2, in which said indicia includes a bar code.

4. A system in accordance with claim 2, in which said identifier is modified to further include indicia to visually indicate whether the specimen has been analyzed.

5. A system in accordance with claim 4, in which said identifier is modified to further include indicia to visually indicate whether abnormalities are present in the sample.

6. A system in accordance with claim 5, in which said identifier is modified to further include indicia to visually indicate whether the specimen has been reanalyzed.

7. A system in accordance with claim 6, in which said identifier is modified to further include indicia to visually indicate whether the specimen has been reanalyzed by a pathologist.

8. A system in accordance with claim 2, in which said identifier is modified to further include indicia to visually indicate whether the specimen has been analyzed by a pathologist.

9. A system in accordance with claim 2, in which said modifying device is a printer which prints additional indicia on said specimen to modify said identifier.

10. A system in accordance with claim 9, in which said printer is coupled to said computer for automatically marking said specimen with at least one visual mark to indicate the presence of abnormalities.

11. A system in accordance with claim 10, in which said visual mark is located adjacent each abnormality.

12. A system in accordance with claim 11, in which said specimen includes a slide and a cover slip for supporting and protecting said sample.

13. A system in accordance with claim 11, in which said identifier is modified with a visual mark adjacent to said sample to indicate the presence of abnormalities in said sample.

14. A system in accordance with claim 10, in which said identifier is modified with said visual mark adjacent said sample to indicate the presence of abnormalities in the sample.

15. A system in accordance with claim 1, in which said identifier includes an electronic identification tag which includes a code which is unique for each specimen.

16. A system in accordance with claim 1, in which said sample is a biological sample and said computerized instrument is a computer controlled microscope.

17. A system in accordance with claim 1, in which said modifying device modifies the identifier to indicate the status of the analysis.

18. A specimen management system comprising:
    a plurality of specimens, each said specimen including a first region with a biological sample to be examined and a second region with an indicia identifier, said identifier being physically located on the specimen having a code unique to said specimen;
    a microscope apparatus for examining said specimens;
    a computer for controlling the operations of said microscope apparatus;
    means for electronically marking any abnormalities found in said samples during said examinations; and
    a printer coupled to said computer for automatically marking said specimens with at least one visual mark in said first region adjacent each abnormality and at least one visual mark in said second region to modify the identifier to indicate the presence of abnormalities.

19. A system in accordance with claim 18, in which said specimen includes a slide and a cover slip for supporting and protecting said sample.

20. A computer controlled microscope apparatus for examining a biological sample on a specimen, said apparatus comprising:
    a specimen handling device for supporting a specimen for movement, said specimen including a biological sample and an identifier being physically located on the specimen having a code unique to said specimen; a reader for reading the identifier;
    means for electronically storing the code of the identifier;
    a microscope device for analyzing the sample;
    means for electronically storing data from said analysis of said sample such that said data is electronically associated with said stored code; and
    a modifying device for physically and visually modifying said identifier to indicate at least one aspect of said analysis of said sample.

21. An apparatus in accordance with claim 20, in which said identifier is in the form of indicia.

22. An apparatus in accordance with claim 21, in which said indicia includes a bar code which is unique to said specimen.

23. An apparatus in accordance with claim 21, in which said identifier is modified to further include indicia to visually indicate whether the specimen has been analyzed.

24. An apparatus in accordance with claim 21, in which said identifier is modified to further include indicia to visually indicate whether abnormalities are present in the sample.

25. An apparatus in accordance with claim 20, in which said modifying device is a printer.

26. A process for managing specimens examined by an operator with a computer controlled microscope apparatus, said process comprising:

providing a specimen including a biological sample and an identifier being physically located on the specimen having a code unique to said specimen;

reading said identifier and electronically storing said code;

examining said sample with a computer controlled microscope apparatus and electronically storing data from said examination such that said data is electronically associated with said stored code; and physically and visually modifying said identifier to indicate at least one aspect of said examination.

27. A process in accordance with claim 26, in which said identifier includes a bar code.

28. A process in accordance with claim 26, in which said sample is examined for abnormalities.

29. A process in accordance with claim 26, in which said identifier is modified to visually indicate whether the specimen has been examined.

30. A process in accordance with claim 29, in which said identifier is further modified to visually indicate whether any abnormalities are present in the sample.

* * * * *